United States Patent
Allen

(10) Patent No.: US 11,261,670 B1
(45) Date of Patent: Mar. 1, 2022

(54) VIV SUPPRESSION FOR RETROFIT WITH MINIMAL TOOLING

(71) Applicant: VIV Solutions LLC, Richmond, TX (US)

(72) Inventor: Donald Wayne Allen, Richmond, TX (US)

(73) Assignee: VIV SOLUTIONS LLC, Richmond, TX (US)

( * ) Notice: Subject to any disclaimer, the term of this patent is extended or adjusted under 35 U.S.C. 154(b) by 0 days.

(21) Appl. No.: 16/924,112

(22) Filed: Jul. 8, 2020

Related U.S. Application Data

(60) Provisional application No. 62/871,693, filed on Jul. 8, 2019.

(51) Int. Cl.
| | |
|---|---|
| F15D 1/10 | (2006.01) |
| E02B 17/00 | (2006.01) |
| E21B 17/01 | (2006.01) |
| F16L 1/12 | (2006.01) |
| B63B 21/50 | (2006.01) |

(52) U.S. Cl.
CPC .............. *E21B 17/01* (2013.01); *B63B 21/50* (2013.01); *F15D 1/10* (2013.01); *F16L 1/123* (2013.01); *B63B 2021/504* (2013.01)

(58) Field of Classification Search
CPC ....... E21B 17/01; E21B 17/012; B63B 21/50; B63B 2021/504; F15D 1/10; F16L 1/123; E02B 17/003
USPC .............................. 405/195.1, 211, 216, 212
See application file for complete search history.

(56) References Cited

U.S. PATENT DOCUMENTS

| | | | | |
|---|---|---|---|---|
| 3,391,244 A * | 7/1968 | Moll | ......... | H02G 7/16 174/40 R |
| 3,992,566 A * | 11/1976 | Kerimov | ......... | H02G 7/14 174/42 |
| 4,398,487 A * | 8/1983 | Ortloff | ......... | B63B 1/32 114/243 |
| 4,549,035 A * | 10/1985 | Zaltsberg | ......... | H02G 7/14 114/243 |
| 4,657,116 A * | 4/1987 | Gardner | ......... | F16F 15/00 114/312 |
| 4,722,367 A * | 2/1988 | Swink | ......... | F15D 1/10 138/178 |
| 5,102,265 A * | 4/1992 | Dokmo | ......... | E02B 17/0026 405/195.1 |
| 5,421,413 A * | 6/1995 | Allen | ......... | B63B 39/005 166/335 |
| 5,460,463 A * | 10/1995 | Smith | ......... | E02D 5/60 405/212 |
| 5,573,354 A * | 11/1996 | Koch | ......... | E02D 5/60 405/216 |
| 5,738,034 A * | 4/1998 | Wolff | ......... | B63B 21/502 114/243 |

(Continued)

*Primary Examiner* — Edwin J Toledo-Duran
(74) *Attorney, Agent, or Firm* — Womble Bond Dickinson (US) LLP

(57) ABSTRACT

A vortex-induced vibration (VIV) suppression apparatus comprising: a strake having a cylindrical body portion dimensioned to encircle an underlying tubular, a fin portion extending radially outward from the body portion and helically positioned around the body portion, and a gap formed through the body portion and the fin; and a connecting assembly configured to facilitate attachment of the strake to an underlying tubular.

19 Claims, 6 Drawing Sheets

(56) References Cited

U.S. PATENT DOCUMENTS

| | | | |
|---|---|---|---|
| 5,984,584 A * | 11/1999 | McMillan | E21B 17/01 114/243 |
| 6,019,549 A * | 2/2000 | Blair | E01D 19/02 24/460 |
| 6,048,136 A * | 4/2000 | Denison | B63B 21/502 114/243 |
| 6,347,911 B1 * | 2/2002 | Blair | E01D 19/02 24/462 |
| 6,401,646 B1 * | 6/2002 | Masters | B63B 21/502 114/243 |
| 6,755,005 B2 * | 6/2004 | Czachor | F01D 25/24 52/630 |
| 6,896,447 B1 * | 5/2005 | Taquino | E21B 17/01 405/216 |
| 7,017,666 B1 * | 3/2006 | Allen | B63B 21/502 114/243 |
| 7,458,752 B2 * | 12/2008 | Esselbrugge | B63B 21/502 405/216 |
| 7,600,945 B2 * | 10/2009 | Burgess | B63B 21/502 405/216 |
| 7,845,299 B2 * | 12/2010 | Masters | F15D 1/10 114/243 |
| 8,475,085 B2 * | 7/2013 | Masters | F16L 1/123 405/216 |
| 8,511,245 B2 * | 8/2013 | Dehne | F16L 1/15 114/243 |
| 8,579,546 B2 * | 11/2013 | Masters | B29C 45/14622 405/216 |
| 8,770,894 B1 * | 7/2014 | Allen | E21B 17/01 405/211.1 |
| 8,944,722 B1 * | 2/2015 | Allen | F16L 1/123 405/216 |
| 9,080,392 B1 * | 7/2015 | Allen | F16L 1/123 |
| 9,140,385 B2 * | 9/2015 | Meijer | F16L 1/26 |
| 9,511,825 B1 * | 12/2016 | Henning | B63B 21/663 |
| 9,546,523 B1 * | 1/2017 | Allen | E21B 17/1078 |
| 9,567,745 B2 * | 2/2017 | Moeller | E04B 1/98 |
| 9,869,128 B1 * | 1/2018 | Allen | E21B 17/01 |
| 10,337,649 B1 * | 7/2019 | Dehne | F16L 1/123 |
| 10,473,131 B1 * | 11/2019 | Allen | F16L 1/123 |
| 10,669,785 B1 * | 6/2020 | Allen | E21B 17/012 |
| 10,808,683 B2 * | 10/2020 | Jensen | F03D 80/00 |
| 10,865,910 B1 * | 12/2020 | Allen | F16L 1/123 |
| 2002/0146287 A1 * | 10/2002 | Allen | B63B 21/502 405/211 |
| 2006/0021560 A1 * | 2/2006 | McMillan | E21B 17/01 114/221 R |
| 2006/0102789 A1 * | 5/2006 | Schmidt | B64C 23/00 244/130 |
| 2006/0153642 A1 * | 7/2006 | Esselbrugge | B63B 39/005 405/216 |
| 2007/0231077 A1 * | 10/2007 | Burgess | F16L 1/123 405/216 |
| 2008/0025800 A1 * | 1/2008 | Watkins | B63B 21/502 405/216 |
| 2008/0035351 A1 * | 2/2008 | Masters | E21B 17/01 166/367 |
| 2009/0185867 A1 * | 7/2009 | Masters | C09D 7/63 405/216 |
| 2009/0252559 A1 * | 10/2009 | Masters | E21B 19/002 405/195.1 |
| 2010/0181064 A1 * | 7/2010 | Knobloch | E21B 17/1057 166/99 |
| 2012/0291687 A1 * | 11/2012 | Dehne | F16L 1/123 114/271 |
| 2016/0053554 A1 * | 2/2016 | Skaugset | F15D 1/10 166/367 |
| 2016/0102783 A1 * | 4/2016 | Skaugset | F16L 1/123 405/216 |
| 2018/0135666 A1 * | 5/2018 | Van Belkom | E21B 17/01 |

* cited by examiner

VIV SUPPRESSION FOR RETROFIT WITH MINIMAL TOOLING

CROSS-REFERENCE TO RELATED APPLICATION

The application is a non-provisional application of co-pending U.S. Provisional Patent Application No. 62/871,693, filed Jul. 8, 2019 and incorporated herein by reference.

FIELD

A vortex induced vibration (VIV) suppression device for retrofit with minimal tooling, for example, a VIV suppression latching system for retrofitting VIV suppression devices underwater. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression, but can be difficult to install on a tubular underwater.

When a tubular is already installed in the ocean, installation of a VIV suppression device subsea is called "retrofitting" and often requires at least one remote-operated-vehicle (ROV) which is essentially an underwater robot. Installation is sometimes possible using a diver or human-assist device, but for deeper waters an ROV or an autonomous underwater vehicle (AUV) is required.

A problem associated with previous generations of retrofit helical strakes, fairings, or associated collars is that they required a large tool in order to be installed with an ROV. This tooling is very expensive and its infrequent use requires maintenance costs that are high on a per project basis. Another problem associated with previous generations of retrofit fairings is that they could come off in high currents or storms due to inadequate latching. Still another problem associated with retrofitting VIV suppression devices is that the latching system must be easy to operate due to the difficulty with maintaining the position of an ROV when underwater and due to the relatively limited movements and degrees of freedom of the manipulator arms of an ROV. Still another problem associated with retrofitting VIV suppression devices is that the costs of mobilizing and using systems for installation (whether it is diver, other human assisted, ROV, or AUV) are very high with both large mobilization rates and large day or hourly rates of both the people and associated equipment.

SUMMARY

The present invention is directed to a VIV suppression latching system for retrofitting VIV suppression devices underwater. Representatively, a retrofit latch or latching system that is easy to operate, reliable and steadfast is provided. In addition, a retrofit VIV suppression device that utilizes minimal tooling and is relatively quick to install is provided.

Representatively, a vortex-induced vibration (VIV) suppression system is disclosed including a strake having a cylindrical body portion dimensioned to encircle an underlying tubular, a fin portion extending radially outward from the body portion and helically positioned around the body portion, and a gap formed through the body portion and the fin; and a connecting assembly configured to facilitate attachment of the strake to an underlying tubular. In one aspect, the connecting assembly comprises a hinge connected to a first section and a second section of the body portion which define the gap, and wherein the hinge is configured to facilitate opening of the body portion for insertion of the underlying tubular. The hinge may include first set of hinge blocks connected to the first section, a second set of hinge blocks connected to the second section and a bolt around which the first set of hinge blocks and the second set of hinge blocks are operable to rotate. In another aspect, the connecting assembly may include a latch connected to a first section and a second section of the body portion which define the gap, and wherein the latch is configured to facilitate closing of the body portion around an underlying tubular. In another aspect, the latch may include a nut housing base attached to the first section, a pin housing base attached to the second section and pin operable to be inserted through the pin housing and the nut housing to secure the first section and the second section together around the underlying tubular. In some aspects, a compression spring is coupled to the pin to resist forces pushing the pin into the pin housing. In some aspects, the connecting member may further include a nut positioned in the nut housing, wherein the nut comprises at least one tab which deflects upon insertion of the pin within the nut and increases a force required to remove the pin from the nut. In another aspect, the connecting member may include a guide flange extending radially outward from the body portion. The guide flange may include a first guide flange extending from a first section of the body portion and a second guide flange extending from a second section, and the first and second guide flanges define the gap such that upon pressing the first and second guide flanges against an underlying tubular, the first and second guide flanges cause the body portion to open. In some aspects, the first and second guide flanges have a triangular shape. A stiffening member configured to locally increase a stiffness of the body portion may further be provided. The stiffening member may include a number of raised regions molded into the body portion.

In another aspect, a vortex-induced vibration (VIV) suppression device includes a strake body portion having a first section and a second section separated by a first gap and a second gap; a fin portion extending radially outward from the body portion; and a connecting assembly at the first gap or the second gap and configured to facilitate attachment of the strake body portion to an underlying tubular. The connecting assembly may include a hinge connected to the first section and the second section of the body portion at the first gap, and wherein the hinge is configured to facilitate opening of the body portion for insertion of the underlying tubular. The hinge may include a first set of hinge blocks connected to the first section, a second set of hinge blocks connected to the second section and a bolt around which the first set of hinge blocks and the second set of hinge blocks are operable to rotate. The connecting assembly may further include a latch connected to the first section and the second section of the body portion at the second gap, and wherein the latch is configured to facilitate closing of the body portion around an underlying tubular. The may include a nut housing base attached to the first section, a pin housing base attached to the second section and pin operable to be inserted through the pin housing and the nut housing to secure the first section and the second section together around the underlying tubular. In some aspects, a compression spring may be coupled to the pin to resist forces pushing the pin into the pin housing. A nut positioned in the nut housing may further be provided and include at least one tab which deflects upon insertion of the pin within the nut and increases a force required to remove the pin from the nut. The connecting member may include a guide flange extending radially outward from the body portion. The guide flange may include a first guide flange extending from the first section of the body portion and a second guide flange extending from the second section, and wherein the first and second guide flanges define the first gap or the second gap such that upon pressing the first and second guide flanges against an underlying tubular, the first and second guide flanges cause the body portion to open. The first and second guide flanges may have a triangular shape.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have advantages not specifically recited in the above summary.

BRIEF DESCRIPTION OF THE DRAWING

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section, we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1A:
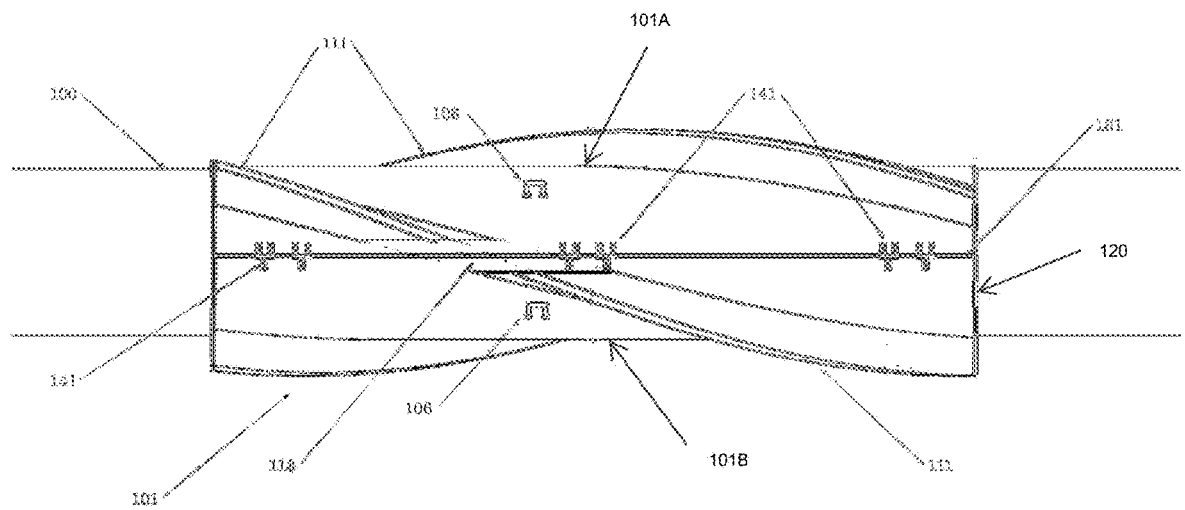
FIG. 1A is a side view of a retrofit helical strake on a tubular showing the hinge side.

Referring now to the invention in more detail, FIG. 1A shows one side of helical strake 101 on tubular 100 having fins 111 and handles 106. Helical strake 101 may include a body portion 120 with fins 111 extending radially outward from the body portion 120. The body portion 120 may be, for example, a sleeve having a cylindrical shape such that it can completely (or almost completely) encircle the underlying tubular 100. In this aspect, body portion 120 may have an inner diameter substantially the same as, or slightly larger than, the tubular 100, or other underlying structure, such that it fits round the tubular or other structure.

Fins 111 may have a substantially triangular cross-sectional shape as shown, however, other shapes may be suitable (e.g. circular, square, etc.). In addition, fins 111 may be helically arranged around body portion, and between the ends of the strake body as shown. Fins 111 are important for providing effective suppression of VIV by disrupting the normal flow around tubular 100.

Hinges 141 along hinge gap 113 are used to assist with opening helical strake 101. Gap 113 may be present in one of fins 111 and be formed by part of the gap 181 which extends axially along the length of strake 101. Representatively, gap 181 may extend axially along one side of helical strake 101 and gap 113 may extend through one of fins 111 as shown. Another gap 132 may be formed along the other side of helical strake 101 to divide strake body portion 120 into at least two sections 101A, 101B, as will be discussed in more detail in reference to FIG. 1B.

Again referring to FIG. 1A, hinges 141 are used to connect the edges of sections 101A, 101B forming gap 181 so that helical strake 101 can be opened and placed around tubular 100. It should be noted that hinges 141 are optional since often helical strake 101 will have sufficient flexibility to be opened without using hinges 141. Handles 106 are also optional and can be used during installation to hold onto helical strake 101 and can also be used to move helical strake sections 101A, 101B relative to one another to open helical strake 101. For example, one of handles 106 may be attached to section 101A and another handle 101B may be attached to section 101B. The handles 106 can then be used to move sections 101A, 101B relative to one another about the hinges 141 to open strake 101. Alternatively, it may be possible to push helical strake 101 onto tubular 100 and the helical strake will open at a far side gap (e.g., gap 132 shown in FIG. 1B) while following the path of least resistance.

Still referring to FIG. 1A, all or part of hinges 141 may be of any suitable design and may be separate structures that are attached to sections 101A, 101B of helical strake 101 (using any suitable means of attachment) or may be molded into helical strake 101. Similarly, handles 106 may be of any suitable design and may be separate structures that are attached to sections 101A, 101B of helical strake 101 (using any suitable means of attachment) or may be molded into helical strake 101. Any number of hinges 141 or handles 106 may be used, and they may be made of any suitable material including, but not limited to, plastic, metal, wood, fiberglass or other composite, synthetic, or any combination thereof. Gap 113 may be of any suitable size and is optional. Gap 113 may be used for any one or more reasons including, but not limited to, creating space for a hinge 141, ease of manufacturing, or ease of installation. Any number of fins 111 may have a gap 113. Gap 181 and the associated hinge gap 113 may be of any suitable length along helical strake 101 and may have any suitable width. Gap 181 and/or hinge gap 113 may be continuous or may be made of discrete segments or may not be needed at all.

Figure 1B:
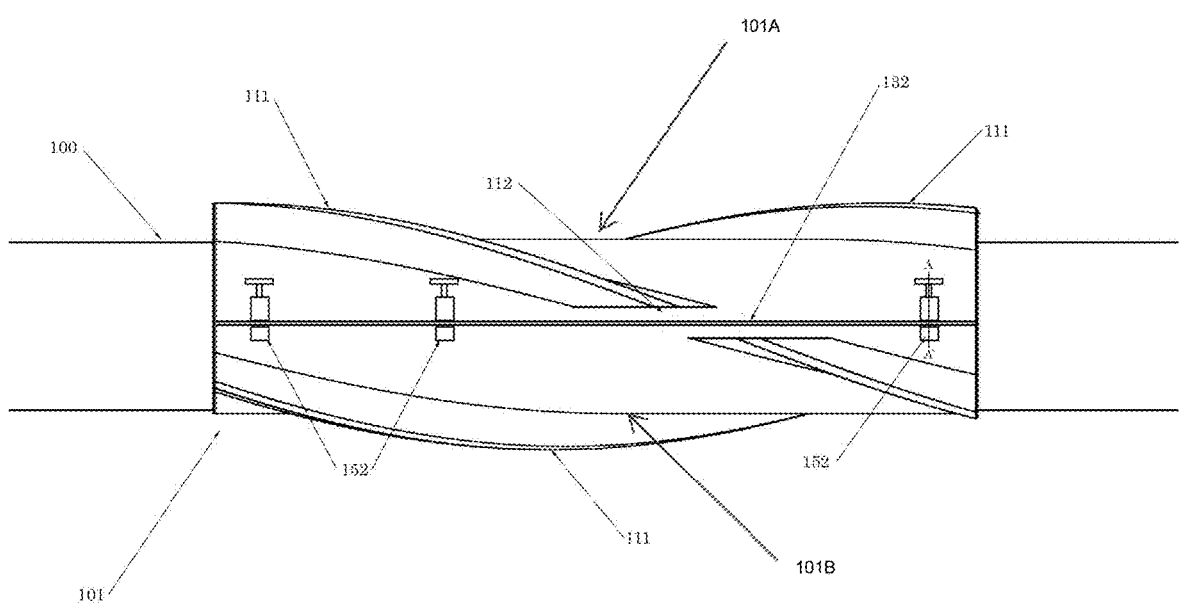
FIG. 1B is a side view of a retrofit helical strake on a tubular showing the latch side.

Referring now to FIG. 1B, FIG. 1B shows an opposite side of helical strake 101 to that of FIG. 1A, on tubular 100 having fins 111 and handles 106. From this view, it can be seen that a latch gap 132 extends axially along the length of strake 101, between sections 101A, 101B. Latches 152 are further positioned along latch gap 132 to assist with closing and securing the sections 101A, 101B of helical strake 101 around tubular 100. A fin gap 112, which may be formed by a section of gap 132, is further shown in a fin near that intersects the latch gap 132.

Again referring to FIG. 1B, latches 152 are used to close helical strake 101 after it has been placed around tubular 100. Any number of latches 152 may be present and latch gap 132 (or gap 181) may be straight as shown or may be helical from one end of helical strake 101 to the other or may take any suitable path between the two ends of helical strake 101. Fin gap 112 is optional but may sometimes be present for one or more of several possible reasons including, but not limited to, the need for space for placing a latch, ease of manufacturing, or ease of installation. Fin gap 112 may be of any suitable size and may be present in one or more fins 111.

Still referring to FIG. 1B, latches 152 may be of any suitable size or shape and may be made of any suitable material including, but not limited to, plastic, metal, fiberglass, composite, or any combination thereof. Each component of latches 152 may be made of different materials, made of the same material, or made of a combination of materials.

Figure 1C:
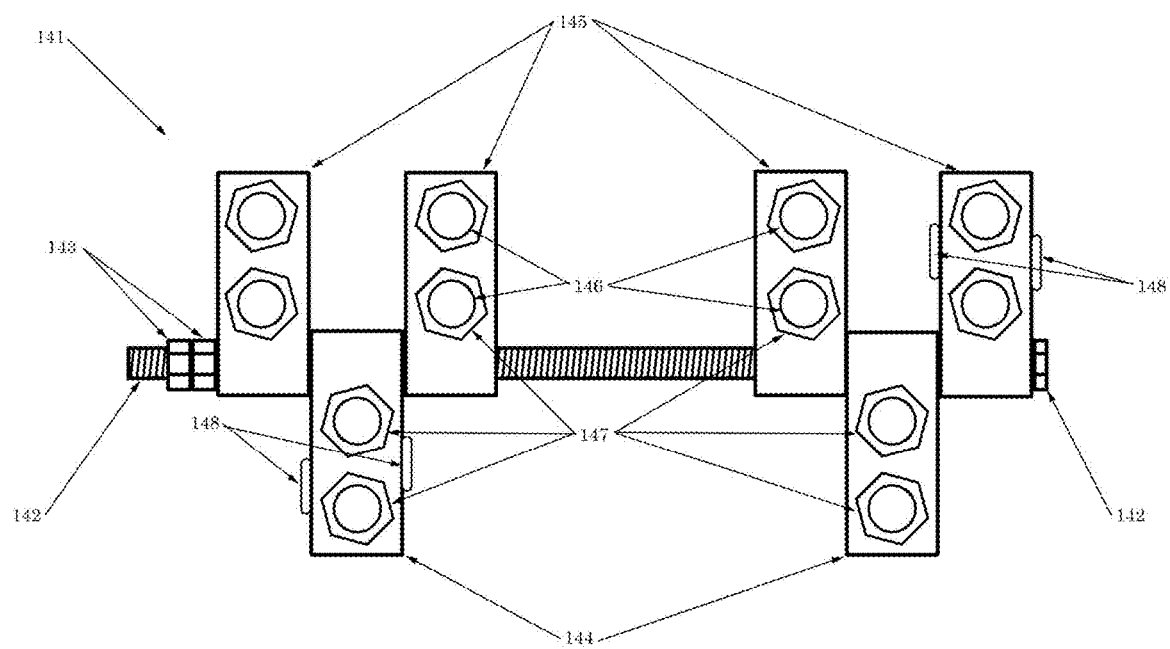
FIG. 1C is a magnified view of the hinge in FIG. 1A.

Referring now to FIG. 1C, FIG. 1C shows a magnified view of hinge 141 of FIG. 1A. From this view, it can be seen that hinge 141 may include a first set of hinge blocks 144 adjacent to a second set of hinge blocks 145. The second set of hinge blocks 145 (e.g., female hinge blocks) may be dimensioned to receive portions of the first set of hinge blocks 144 (e.g., male hinge blocks). The first and second sets of blocks 144, 145 may be secured to the underlying tubular using block bolts 146 and block nuts 147 or with welds 148 and with hinge bolt 142 passing through both sets of blocks and secured using hinge nuts 143.

Again referring to FIG. 1C, FIG. 1C shows details of hinge 141 where the hinge is made up of blocks that mate with hinge bolt 142 running through them so that the blocks can rotate around hinge bolt 142 thus creating the hinge. The hinge bolt 142 may, for example, run parallel to the gap 181. The hinge stiffness may be altered by the compression forces produced by hinge bolt 142 and hinge nuts 132. FIG. 1C shows hinge blocks 144 and hinge blocks 145 secured by block bolts 146 and block nuts 147 and/or by welds 148 but the blocks may be secured by any suitable means including, but not limited to, clamping, riveting, pinning, and chemical bonding. Combinations of securing hinge blocks 144 and hinge blocks 145 may also be used. FIG. 1C shows one specific means of creating hinge 141 but other suitable hinges may be used in place of hinge 141. Both hinge blocks 144 and hinge blocks 145 may be replaced by molded in appurtenances that may be bolted together to create a hinge using a hinge bolt 142. Hinge nuts 143 may be replaced by other suitable structures including, but not limited to, pins (including cross pins and lynch pins), welded upsets, or other appurtenances that serve the simply purpose of not allowing hinge bolt 142 to come out of male hinge blocks 144 and female hinge blocks 145.

Still referring to FIG. 1C, hinge blocks 144 and hinge blocks 145 may be made of any suitable size, shape, or quantity. Hinge bolt 142 may be of any suitable diameter, length, or even cross section and all, or part, of hinge bolt 142 may have threads. Hinge bolt 142 may have a spring attached to it that biases the helical strake towards an open or closed position (including partially open and partially closed positions).

Still referring to FIG. 1C, hinge blocks 144, hinge blocks 145, hinge bolt 142, hinge nuts 143, block bolts 146, and block nuts 147 may be made of any suitable material including, but not limited to, plastic, metal, fiberglass, ceramic, and composite. Each of hinge blocks 144, hinge blocks 145, hinge bolt 142, hinge nuts 143, block bolts 146, and block nuts 147 may be made of the same material, of different materials, or of a combination of materials.

Figure 1D:
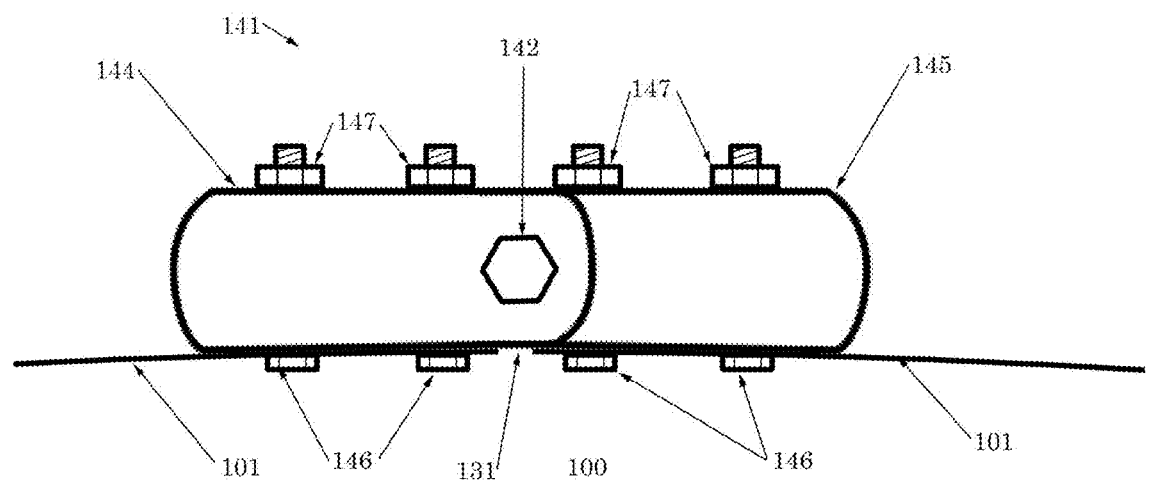
FIG. 1D is a magnified side view of the hinge in FIG. 1C.

Referring now to FIG. 1D, FIG. 1D shows an end view of hinge 141 attached to helical strake 101 which is on underlying tubular 100. Hinge 141 contains hinge block 144 and hinge block 145 which are attached to helical strake 101 using block bolts 146 and block nuts 147. Hinge bolt 142 runs through both hinge block 144 and hinge block 145. Helical strake 101 has hinge gap 131 so that hinge block 144 is attached to helical strake 101 on one side of hinge gap 131 while hinge block 145 is attached to helical strake 101 on the other side of hinge gap 131 from hinge block 144.

Again referring to FIG. 1D, FIG. 1D shows how hinge block 144 and hinge block 145 are attached to helical strake 101 but, as noted above, other means of attachment are possible. Block bolts 146 and block nuts 147 may be countersunk or not countersunk. Helical strake 101 may have one or more pockets molded in so that block bolts 146 or nuts 147 may be recessed so that they do not contact the underlying tubular.

Figure 1E:
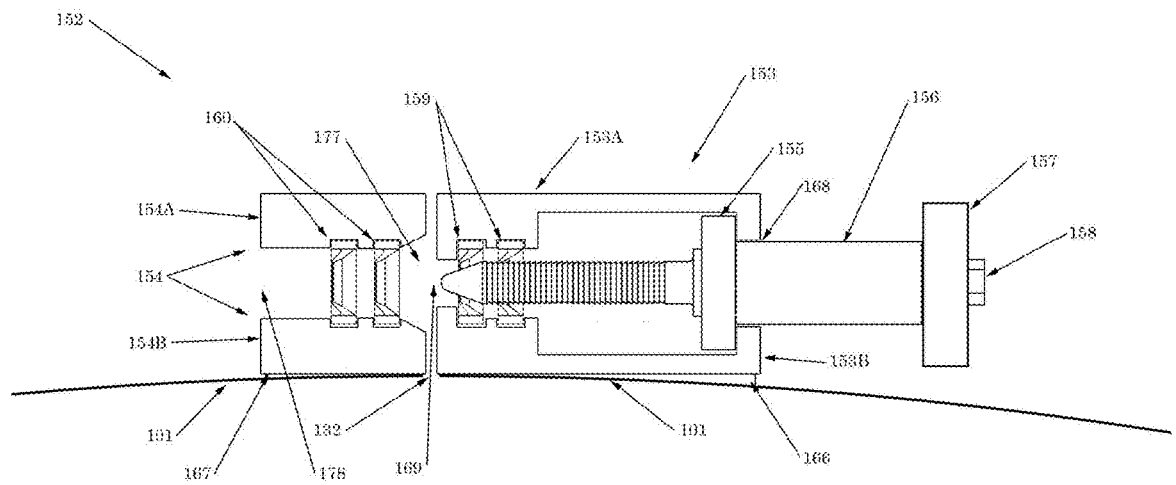
FIG. 1E is a magnified cross-sectional view of the latch in FIG. 1B.

Referring now to FIG. 1E, FIG. 1E shows latch 152 attached to helical strake 101. Latch 152 includes nut housing 154, which consists of upper nut housing 154A and lower nut housing 154B that is attached to nut housing base 167. Nut housing base 167 is, in turn, attached to helical strake 101 on one side of latch gap 132. Latch 152 also includes pin housing 153 which consists of upper pin housing 153A and lower pin housing 153B that is attached to pin housing base 166. Pin housing base 166 is, in turn, attached to helical strake 101 on the other side of latch gap 132 from nut housing 154. Nut housing 154 contains nuts 160 and has rear opening 178 on one side and a tapered opening 177 on the other side. Pin housing 153 contains nuts 159 and pin 155. Pin 155 is connected to plunger head 157 by bolt 158. Spacer 156 is between plunger head 157 and pin 155 and around bolt 158. Spacer 156 travels through plunger opening 168. Pin opening 169 is at the other end of pin housing 153 adjacent to nut housing 154.

Again referring to FIG. 1E, latch 152 works by pushing plunger head 157 towards nut housing 154 so that pin 155 travels through nuts 159 and nuts 160 thereby securing both sides of strake sections 101A, 101B at latch gap 132 using pin 155. Nuts 160 are secured by nut housing 154 and nuts 159 are secured by pin housing 153. Plunger head 157 is attached to pin 155 using bolt 158 so that pin 155 moves in concert with plunger head 157. Spacer 156 is optional but is useful for adding strength and stability to the connection between pin 155 and plunger head 157. Spacer 156 is installed around bolt 158 and may, or may not, extend the entire distance between pin 155 and plunger head 157. FIG. 1E shows two nuts 159 and two nuts 160 but any suitable number of nuts may be used. Nut housing base 167 and pin housing base 166 may be attached to helical strake 101 by any suitable means including, but not limited to, fastening with bolts screws, washers or nuts, welding, chemical bonding, pinning, clamping, and riveting. All or part of nut housing base 167 and pin housing base 166 may be molded into helical strake 101 or nut housing base 167 and pin housing base 166 may be separate structures from helical strake 101. Similarly, all or part of nut housing 154 and pin housing 153 may be molded into helical strake 101 or all or part of nut housing 154 and pin housing 153 may be separate structures from helical strake 101. All components of nut housing 154, pin housing 153, nut housing base 167, and pin housing base 166 may be connected by any suitable means including, but not limited to, fastening with bolts screws, washers or nuts, pinning, welding, chemical bonding, clamping, and riveting.

Still referring to FIG. 1E, nuts 159 may be simply set into nut housing 154 or nuts 159 may be attached to nut housing 154 by any suitable means including, but not limited to, fastening with bolts screws, washers or nuts, pinning, welding, chemical bonding, clamping, and riveting. Similarly, nuts 160 may be set into pin housing 153 or may be attached to pin housing 153 by any suitable means including, but not limited to, fastening with bolts screws, washers or nuts, pinning, welding, chemical bonding, clamping, and riveting. Pin 155 may be optionally pre-installed through one or more nuts 160. Plunger head 157 is shown connected to pin 155 using bolt 158 but plunger head 157 may be connected to pin 155 by any suitable means including, but not limited to, welding, chemical bonding, or clamping. Bolt 158 may be replaced by any suitable structure and pin 155 and plunger head 157 and any inserts or structures between them may all be once single piece or may be made of multiple pieces. Other components or structures may also be used with latch 152 including washers, other fasteners including bolts (for example, more than one bolt 158 may be used to connect plunger head 157 to pin 155), pins, and nuts. Any number of pins 155, plunger heads 157, nuts 159, nuts 160, etc. may be used for latch 152 such that latch 152 should not be limited by the quantity, size, or specific shape of any component. In a general sense, pin 155 is pushed through nuts 159 and nuts 160 by use of a structure that extends outside of pin housing 153.

Still referring to FIG. 1E, rear opening 178 may be of any suitable size and may be used for pin 155 to extend through it or for visually seeing pin 155. With that in mind, the nut side end of pin 155 may be colored with a paint, coating, or material that allows for good visual inspection underwater. Tapered opening 177 may be of any suitable shape and the taper is optional. The idea is to utilize some taper when possible to make it easier for pin 155 to locate the inside of nut housing 154. Pin opening 169 may be of any suitable size and shape and its primary function is to provide an opening for pin 155 to travel through without impeding pin 155 but while still restraining nuts 159. Plunger opening 168 exists to allow bolt 158 and spacer 156 to travel into pin housing 153 and push pin 155 towards nut housing 154. Plunger opening 168 may be of any suitable size and shape but it will often be desirable to have plunder opening 168 just a little larger than spacer 156. Any number of rear opening 178, tapered opening 177, pin opening 169, and plunger opening 168 may be present and their quantity may be dependent upon the number of pins 155, nuts 159, nuts 160, or bolts 158 that are used.

Still referring to FIG. 1E, nuts 159, nuts 160, nut housing 154, nut housing base 167, pin housing base 166, pin 155, plunger head 157, bolt 158, and spacer 168 may be made of any suitable material including, but not limited to, plastic, metal, fiberglass, composite, and wood. Nuts 159, nuts 160, nut housing 154, nut housing base 167, pin housing base 166, pin 155, plunger head 157, bolt 158, and spacer 168 may be made of the same material, may be made of different materials, or may be made of more than one material.

Figure 1F:
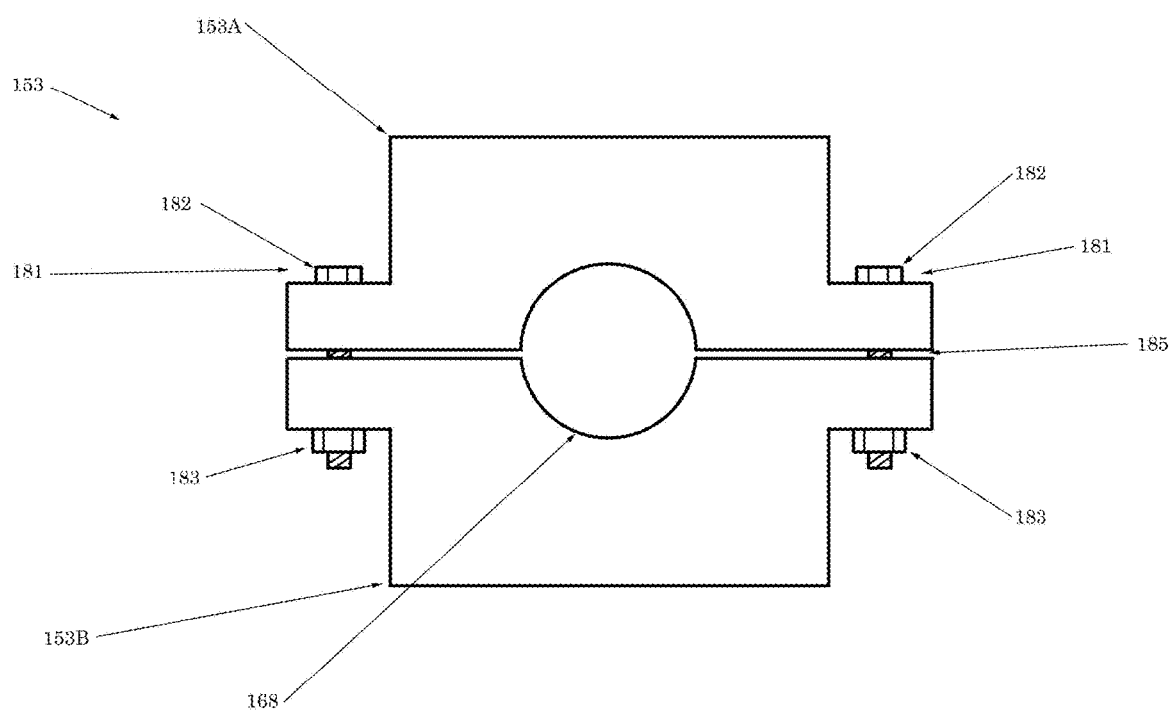
FIG. 1F is a magnified end view of the pin housing in FIG. 1E.

Referring now to FIG. 1F, FIG. 1F shows pin housing 153 having an upper pin housing 153A and lower pin housing 153B which are connected using pin fasteners 181 which consist of pin housing bolts 182 and pin housing nuts 183. Upper pin housing 153A and lower pin housing 153B are separated by pin housing gap 185 and plunger opening 168 is shown in the ends of both upper pin housing 153A and lower pin housing 153B. It should further be understood that all of the attributes ascribed to pin housing 153 in this section may also be applied to nut housing 154 of FIG. 1E. Pin housing 153 is used for this specification for simplicity.

Again referring to FIG. 1F, FIG. 1F shows pin housing 153 may have two halves however pin housing 153 may be of a single unit or may be made of any number of parts or components. Various parts such as upper pin housing 153A and lower pin housing 153B may be attached using pin fasteners 181 or may be attached using any suitable means including, but not limited to, welding, chemical bonding, clamping, riveting, and pinning. FIG. 1F shows pin housing 153 attached using pin fasteners that travel through flanges in pin housing 153, however other appurtenances may be used in place of the flanges or flanges may not be used at all. In general, there are a broad number of ways to connect various parts or components of pin housing 153.

Still referring to FIG. 1F, any number of pin fasteners 181, pin housing bolts 182, and pin housing nuts 183 may be used. Pin housing gap 185 may be of any suitable size and shape and will typically be close to zero in height when upper pin housing 153A is fastened tight against lower pin housing 153B. Pin fasteners 181, pin housing bolts 182, and pin housing nuts 183 may be made of any suitable material including, but not limited to, plastic, metal, fiberglass, and composite.

Figure 1G:
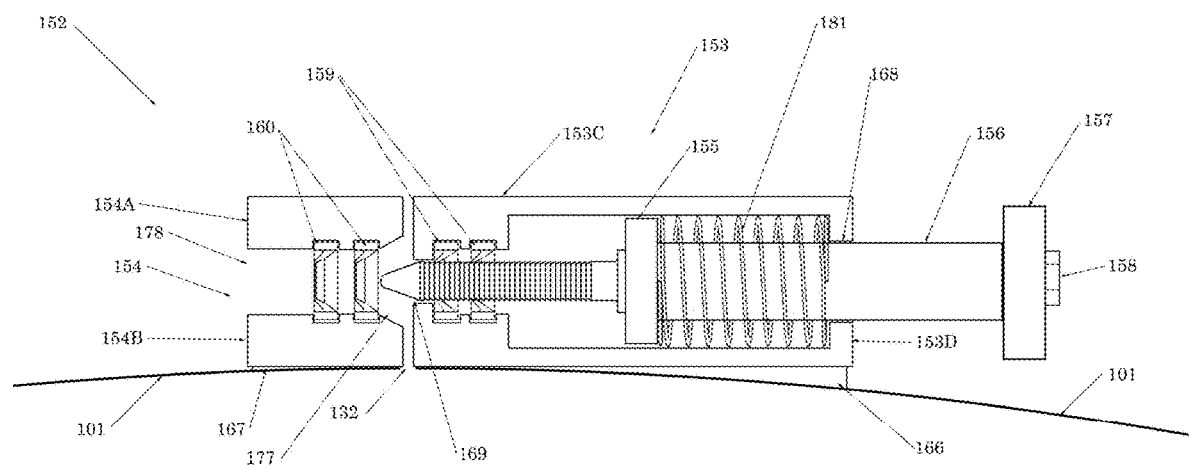
FIG. 1G is a magnified cross-sectional view of a latch utilizing a compression spring.

Referring now to FIG. 1G, FIG. 1G shows latch 152 attached to helical strake 101. Latch 152 includes nut housing 154. Nut housing 154 may include upper nut housing 154A and lower nut housing 154B that is attached to nut housing base 167. Nut housing base 167 may, in turn, be attached to helical strake 101 on one side of latch gap 132 (e.g., to strake section 101A or 101B. Latch 152 also includes pin housing 153. Pin housing 153 may include upper pin housing 153C and lower pin housing 153D that is attached to pin housing base 166. Pin housing base 166 may, in turn, be attached to helical strake 101 on the other side of latch gap 132 from nut housing 154. Nut housing 154 contains nuts 60 and has rear opening 178 on one side and a tapered opening 177 on the other side. Pin housing 153 contains nuts 159 and pin 155. Pin 155 is connected to plunger head 157 by bolt 158. Spacer 156 is between plunger head 157 and pin 155 and around bolt 158. Spacer 156 travels through plunger opening 168. Pin opening 169 is at the other end of pin housing 153 adjacent to nut housing 154. Compression spring 181 is between pin 155 and the end of pin housing 153.

Again referring to FIG. 1G, FIG. 1G is identical to FIG. 1E except that compression spring 181 is located in the area between pin 155 and the end of pin housing 153. Compression spring 181, which is optional, resists forces that push pin 155 back into pin housing 153. By doing so, when helical strake 101 is closed, pin 155 may contact nut housing 154 outside of tapered opening 177 which could prevent latch 152 from being closed. However, when compression spring 181 is present, the interference with nut housing 154 will push pin 155 against compression spring 181 a small distance and allow helical strake 101 to continue to close until pin is adjacent to tapered opening 177. At that point, pin 155 will be free on the end adjacent to nut housing 154 and compression spring 181 will then extend back to its neutral position and thereby push pin 155 some distance into nut housing 154. It is even possible that, if compression spring 181 is so designed, it could push pin 155 through one or both of nuts 160 and remove the need for plunger head 157, bolt 158, and spacer 156.

Still referring to FIG. 1G, any number of compression springs 181 may be present and compression spring 181 may be of any suitable size and shape. Generally however, compression spring 181 will fit in the space between pin 155 and the end of pin housing 153. Compression spring 181 may be made of any suitable material and be of any suitable type of spring. For example, FIG. 1g shows compression spring as a coiled spring but compression spring 181 could also be a simple piece of elastomer that is compressed. Compression spring 181 can also be replaced by an extension spring that is located on the other side of the head of pin 155 so that it resides around what is shown as the threaded portion of pin 155. In this case the extension spring serves the same function as the compression spring by pushing pin 155 towards nut housing 154. An extension spring, if used, may be of any spring type, size, shape, or material.

Figures 1H, 1I:
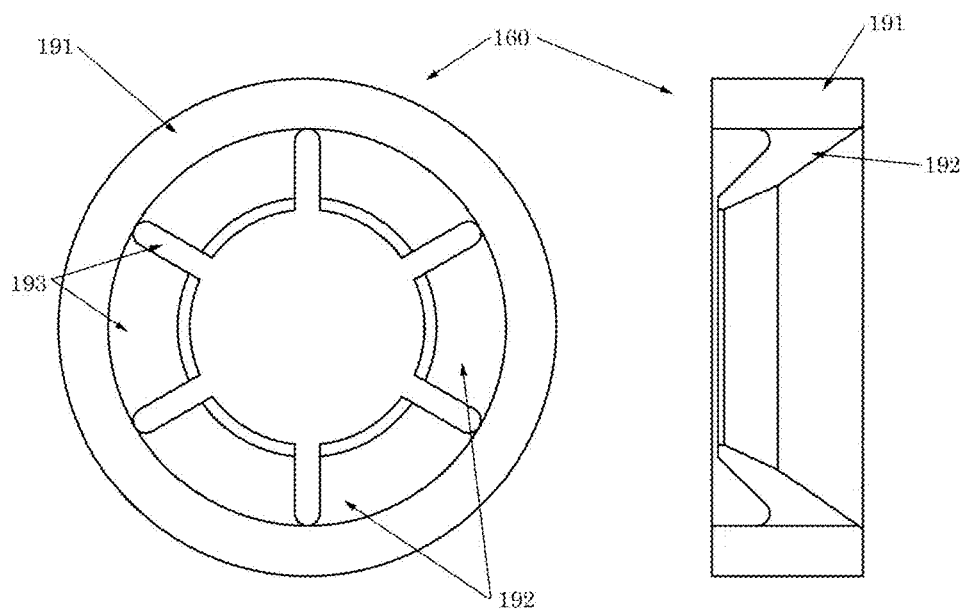
FIG. 1H is a front view of the nut used in the latching system.
FIG. 1I is a side view of the nut of FIG. 1H.

Referring now to FIG. 1H-FIG. 1I, FIG. 1H and FIG. 1I show front and side views respectively of nut 160 having tabs 192 separated by openings 193 with tabs 192 held in place by ring 191. While FIGS. 1H-1I describes nut 160, all of the attributes described herein also refer to nuts 159 and the other nut 160 in FIG. 1E and FIG. 1G.

Again referring to FIGS. 1H-1I, nut 160 works by the deflection of tabs 192 as pin 155 (from FIG. 1E and FIG. 1G) is pushed into it. The tabs deflect thereby allowing the pin to pass through it when sufficient force is applied to the pin. However, the force to reverse the pin is increased due to the tapered angle of the pins. Openings 193 are used to keep the tabs reasonably small so that they may deflect without yielding or fracturing. Ring 191 is used as a base for tabs 192 and as a contact area for the housings so that nut 160 may be restrained and, in particular, constrained from movement in the direction of the pin movement.

Still referring to FIG. 1H, any number of tabs 192 may be used and any number of openings 193 may be present. Ring 191, tabs 192, and openings 193 may be of any suitable size or shape. Ring 191 and tabs 192 may be made of any suitable material including, but not limited to, plastic, metal, fiberglass, and composite. Most commonly, tabs 192 will be made of plastic.

Figure 2A:
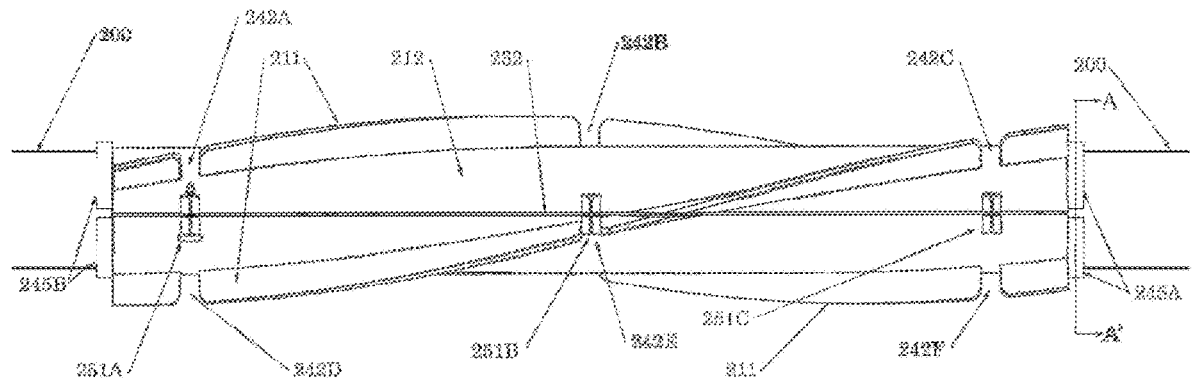
FIG. 2A is a side view of another embodiment of a helical strake.

Referring now to FIG. 2A, FIG. 2A illustrates features which allow the helical strake to be pushed onto the pipe without a tool to open and close the helical strake. FIG. 2A shows helical strake body 212 having fins 211 over tubular 200. Opening or gap 232 allows helical strake body 212 to be placed around tubular 200. Fins 211 have optional channels 242A, 242B, 242C, 242D, 242E, and 242F. Optional latches 251A, 251B, and 251C, which may include a pin and a housing, can be used to secure helical strake body 212 onto tubular 200. Guide flanges 245A and 245B are used to allow helical strake body 212 to be pushed onto tubular 200.

Again referring to FIG. 2A, guide flanges 245A and 245B may be of any suitable shape that enhances their ability to be pushed onto tubular 200 (see FIGS. 2B and 2C below). Guide flanges 245A and 245B may be integral or molded into strake body 212 or attached to strake body 212 as separate members by any suitable means including welding, fastening, riveting, chemical bonding, and use of an interference fit. Guide flanges 245A and 245B may be of any suitable size or shape and may extend along the pipe axis any suitable distance. While not shown, any number of springs may be used between strake body 212 and tubular 200 or as part of latches 251A, 251B, or 251C or as part of guide flanges 245A or 245B. Latches 251A, 251B, and 251C are optional since, if the strake is sufficiently thick or has stiffening members present, then latching may not be necessary to restrain helical strake body 212 onto tubular 200. Representative stiffening members 288 are shown in FIG. 2D and may include various appurtenances designed to locally increase the stiffness of helical strake body 212 or simply raised areas that are molded into helical strake body 212 so as to make it more difficult to pull helical strake body 212 off of tubular 200.

Still referring to FIG. 2A, guide flanges 245A and 245B may be of any suitable material including, but not limited to, plastic, metal, wood, ceramic, rubber or elastomer, or composite. Guide flanges 245A and 245B may be made of a single material or composed of more than one material and guide flanges 245A and 245B do not need to be of the same shape nor do they have to have the same material composition.

Figure 2B:
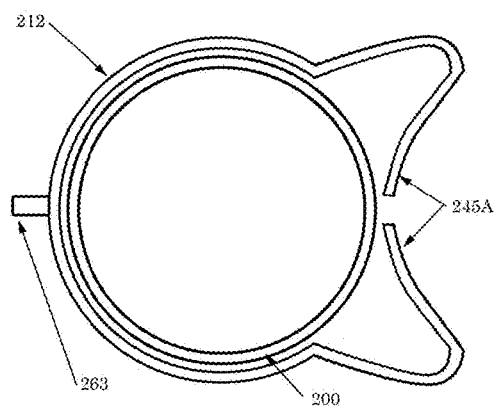
FIG. 2B is a cross sectional view of the helical strake along line A-A' of FIG. 2A.

Referring now to FIG. 2B, FIG. 2B shows cross section A-A' from FIG. 2A with helical strake body 212 having guide flange 245A and shown on tubular 200. Optional handle 263 is shown attached to helical strake body 212.

Again referring to FIG. 2B, FIG. 2B shows helical strake body 212 after it has been pushed onto tubular 200 and it is clear that guide flange 245A, by virtue of having an outside face that roughly matches the opposing shape of tubular 200, allows for helical strake body 212 to be pushed onto tubular 200. Without the presence of guide flange 245A, when pushed towards tubular 200 helical strake body 212 would tend to slide past tubular 200 and not onto tubular 200.

Still referring to FIG. 2B, guide flange 245A may have any number of components and have any suitable shape that enhances its ability to slide onto tubular 200. For example, guide flange 245A may have simple triangular pieces that are sloped so that tubular 200 fits between the triangular pieces and allows helical strake body 212 to be easily pushed onto tubular 200. As noted above, any suitable shape may be molded into helical strake body 212 or may be attached separately onto helical strake body 212 and may consist of any number of components made of any suitable material. Guide flange 245A causes only a slight change in the VIV suppression performance of helical strake body 212 and thus guide flange 245A may consist of materials that corrode, dissolve, or erode away once helical strake body 212 is installed around tubular 200. Thus, the primary function of guide flange 245A is for installation of helical strake body 212 and not for VIV suppression.

Figure 2C:
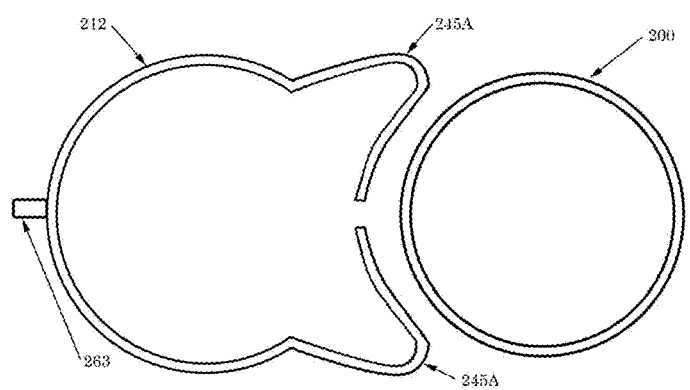
FIG. 2C is a cross sectional view of a helical strake including a guide flange.
Figure 2D:
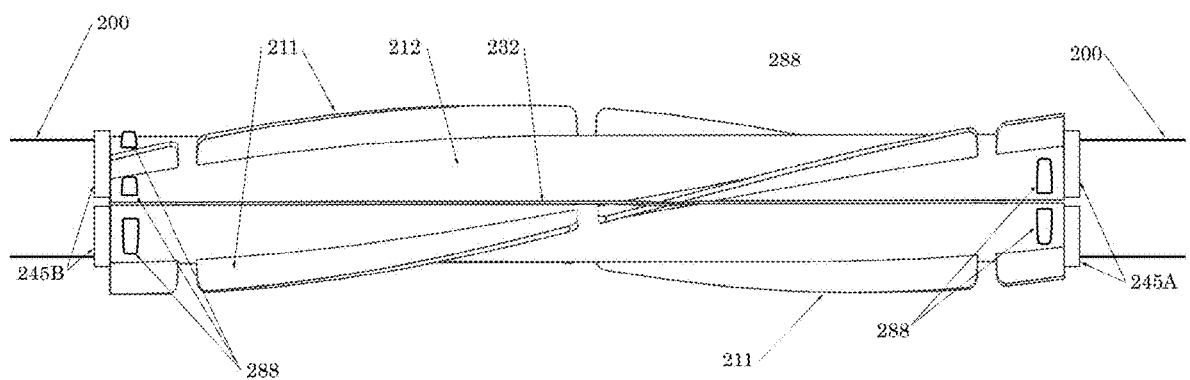
FIG. 2D is a cross sectional view of a helical strake including a stiffening member.

Referring now to FIG. 2C, FIG. 2C is similar to FIG. 2B but shows helical strake body 212 having guide flange 245A adjacent to tubular 200. Optional handle 263 is shown attached to helical strake body 212.

Again referring to FIG. 2C, when helical strake body 212 or optional handle 263 is pushed towards tubular 200 (which is relatively fixed), guide flange 245A will envelope tubular 200 which will then push helical strake body 212 open so that it will continue to open up as it is pushed onto tubular 200 until eventually it closes around tubular 200.

The above aspects of this invention may be mixed and matched in any manner suitable to achieve the purposes of this invention. Springs may also be used with any of the fastening or coupling methods described herein. While a helical strake is used as an example herein, the aspects of this invention may also apply to other VIV suppression devices such as fairings and collars. Also, the VIV suppression device may fully cover the circumference of the underlying tubular or may only partially cover the circumference of the underlying tubular.

In broad embodiments, the present invention consists of a VIV suppression device that may be installed onto a tubular using minimal tooling. It normally will utilize one guide or guide flange that is used to install the VIV suppression device onto a tubular. While a helical strake is illustrated herein, other VIV suppression devices such as fairings (of all shapes) be utilize the same mechanisms for installation onto a tubular. It is also recognized that, while the present invention describes a VIV suppression device that is installed underwater, this invention is not restricted to underwater use and may be utilized for installations above the water surface too (such as on the deck of a vessel, in a shop or a yard, etc.).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

What is claimed is:

1. A vortex-induced vibration (VIV) suppression system comprising:

a strake having a cylindrical body portion dimensioned to encircle an underlying tubular that is used underwater, a fin portion extending radially outward from the body portion and helically positioned around the body portion, and a gap formed through the body portion; and a connecting assembly configured to facilitate attachment of the strake to an underlying tubular, wherein the connecting assembly comprises a first pair of guide flanges extending from a first end of the cylindrical body portion and a second pair of guide flanges extending from a second end of the cylindrical body portion, the first and second pair of guide flanges extend less than an entire length of the cylindrical body portion and each of the first and second pair of guide flanges comprise a first guide flange extending from a first section of the body portion and a second guide flange extending from a second section of the body portion, the first and second guide flanges are on opposite sides of the gap and define an opening for receiving an underlying tubular that is less than 30 degrees relative to a circumference of the cylindrical body portion and each of the first and second guide flanges extend away from the gap and have curved sides that are dimensioned to increase a size of the gap upon pressing the first and second guide flanges against an underlying tubular.

2. The VIV suppression system of claim 1 wherein the first and second guide flanges have a first portion extending radially outward from the body portion to form a first slope and a second portion extending inward from the first portion to form a second slope toward the gap, wherein the second portion of the first guide flange and the second portion of the second guide flange extend toward one another.

3. The VIV suppression system of claim 2 wherein an outer face of the second portion that faces the underlying tubular is curved such that upon pressing the first and second guide flanges against the underlying tubular, the first and second guide flanges cause the body portion to open.

4. The VIV suppression system of claim 1 wherein the first and second guide flanges comprise a triangular shape.

5. The VIV suppression system of claim 1 further comprising a stiffening member configured to locally increase a stiffness of the body portion.

6. The VIV suppression system of claim 5 wherein the stiffening member comprises a number of raised regions molded into the body portion.

7. The VIV suppression system of claim 1 wherein the connecting assembly is a first connecting assembly, and the system further comprises a second connecting assembly, the second connecting assembly comprises a hinge connected to a first section and a second section of the body portion which define the gap, and wherein the hinge is configured to facilitate opening of the body portion for insertion of the underlying tubular.

8. The VIV suppression system of claim 7 wherein the hinge comprises a first set of hinge blocks connected to the first section, a second set of hinge blocks connected to the second section and a bolt around which the first set of hinge blocks and the second set of hinge blocks are operable to rotate.

9. The VIV suppression system of claim 1 wherein the connecting assembly is a first connecting assembly, and the system further comprises a second connecting assembly, the second connecting assembly comprises a latch connected to a first section and a second section of the body portion which define the gap, and wherein the latch is configured to facilitate closing of the body portion around an underlying tubular.

10. The VIV suppression system of claim 9 wherein the latch comprises a nut housing base attached to the first section, a pin housing base attached to the second section and a pin operable to be inserted through the pin housing and the nut housing to secure the first section and the second section together around the underlying tubular.

11. The VIV suppression system of claim 1 wherein the gap is formed through the body portion and the fin.

12. The VIV suppression system of claim 1 wherein the gap comprises a helical shape.

13. A vortex-induced vibration (VIV) suppression device comprising:
   a strake body portion having a first section and a second section separated by a gap;
   a fin portion extending radially outward from the body portion; and
   a connecting assembly configured to facilitate attachment of the strake to an underlying tubular operable for use underwater, wherein the connecting assembly comprises a pair of guide flanges extending, from a first end of the cylindrical body portion, the pair of guide flanges extend less than an entire length of the cylindrical body portion and comprise a first guide flange extending from a first section of the body lion and guide flange extending from a second section of the body portion, the first and second guide flanges are on opposite sides of the gap and define an opening for receiving an underlying tubular that is less than 30 degrees relative to a circumference of the cylindrical body portion and each of the first and second guide flanges extend away from the gap and are dimensioned to increase a size of the gap upon pressing the first and second guide flanges against an underlying tubular.

14. The VIV suppression device of claim 13 wherein the gap is a first gap and the connecting assembly is a first connecting assembly, the body portion further comprises a second gap and a second connecting assembly, the second connecting assembly comprises a hinge having a first set of hinge blocks connected to the first section, a second set of hinge blocks connected to the second section and a bolt running parallel to the second gap and around which the first set of hinge blocks and the second set of hinge blocks are operable to rotate.

15. The VIV suppression device of claim 13 wherein the first and second guide flanges comprise a triangular shape.

16. The VIV suppression system of claim 13 further comprising a number of appurtenances extending from the body portion to locally increase a stiffness of the body portion.

17. The VIV suppression device of claim 13 wherein the connecting assembly is a first connecting assembly, and the device further comprises a second connecting assembly comprising a latch connected to the first section and the second section of the body portion, and wherein the latch is configured to facilitate closing of the body portion around an underlying tubular.

18. The VIV suppression device of claim 17 wherein the latch comprises a nut housing base attached to the first section, a pin housing base attached to the second section, a pin operable to be inserted through the pin housing and the nut housing to secure the first section and the second section together around the underlying tubular.

19. The VIV suppression device of claim 18 further comprising a nut positioned in the nut housing, wherein the nut comprises at least one tab which deflects upon insertion of the pin within the nut and increases a force required to remove the pin from the nut.

* * * * *